United States Patent
Kunnari et al.

(10) Patent No.: US 10,396,328 B2
(45) Date of Patent: Aug. 27, 2019

(54) CELLULOSE BASED FUNCTIONAL COMPOSITES, ENERGY STORAGE DEVICES AND MANUFACTURING METHODS THEREOF

(71) Applicant: Teknologian tutkimuskeskus VTT Oy, Espoo (FI)

(72) Inventors: Vesa Kunnari, Espoo (FI); Otto-Ville Kaukoniemi, Espoo (FI)

(73) Assignee: Teknologian tutkimuskeskus VTT Oy, Espoo (FI)

( * ) Notice: Subject to any disclaimer, the term of this patent is extended or adjusted under 35 U.S.C. 154(b) by 149 days.

(21) Appl. No.: 15/524,654

(22) PCT Filed: Nov. 6, 2015

(86) PCT No.: PCT/FI2015/050766
§ 371 (c)(1),
(2) Date: May 5, 2017

(87) PCT Pub. No.: WO2016/071573
PCT Pub. Date: May 12, 2016

(65) Prior Publication Data
US 2017/0346059 A1    Nov. 30, 2017

(30) Foreign Application Priority Data
Nov. 6, 2014 (FI) ..................................... 20145974

(51) Int. Cl.
*H01M 2/16* (2006.01)
*C08L 1/02* (2006.01)
(Continued)

(52) U.S. Cl.
CPC ........... *H01M 2/1626* (2013.01); *C08B 15/08* (2013.01); *C08L 1/02* (2013.01); *H01G 11/38* (2013.01);
(Continued)

(58) Field of Classification Search
CPC .. H01M 2/1626; H01M 2/1673; H01M 4/622; C08B 15/08; C08L 1/02;
(Continued)

(56) References Cited

U.S. PATENT DOCUMENTS

2006/0166093 A1    7/2006 Zaghib et al.
2008/0003501 A1    1/2008 Vincze et al.
(Continued)

FOREIGN PATENT DOCUMENTS

| JP | 2014086285 A * | 5/2014 |
| WO | WO2008034939 A1 | 3/2008 |
| WO | WO2011076979 A1 | 6/2011 |
| WO | WO2013076372 A1 | 5/2013 |

(Continued)

*Primary Examiner* — Basia A Ridley
*Assistant Examiner* — Heng M. Chan
(74) *Attorney, Agent, or Firm* — Seppo Laine Oy

(57) ABSTRACT

Document discloses new technologies for utilizing cellulose based materials in composites and electrically functionalized structures, such as energy storage devices. The object of the invention is achieved by means of high consistency fibrillated cellulose with at least one functional additive. This high consistency mixture is processed to form the composite structure having a shape and then dried or let to dry.

21 Claims, 2 Drawing Sheets

(51) Int. Cl.
  *H01M 4/62* (2006.01)
  *H01G 11/52* (2013.01)
  *H01G 11/38* (2013.01)
  *C08B 15/08* (2006.01)
  *B82Y 30/00* (2011.01)

(52) U.S. Cl.
  CPC .......... *H01G 11/52* (2013.01); *H01M 2/1673* (2013.01); *H01M 4/622* (2013.01); *B82Y 30/00* (2013.01); *Y02E 60/13* (2013.01)

(58) Field of Classification Search
  CPC ........ H01G 11/38; H01G 11/52; Y02E 60/13; B82Y 30/00; C08K 3/04
  See application file for complete search history.

(56) References Cited

U.S. PATENT DOCUMENTS

| | | |
|---|---|---|
| 2014/0203219 A1 | 7/2014 | Nishijima et al. |
| 2014/0255782 A1 | 9/2014 | Jabbour et al. |
| 2014/0302336 A1 | 10/2014 | Heiskanen et al. |
| 2016/0005551 A1* | 1/2016 | Ishii .................. H01M 4/62 |
| | | 429/217 |

FOREIGN PATENT DOCUMENTS

| | | | | |
|---|---|---|---|---|
| WO | WO2013180073 A1 | 12/2013 | | |
| WO | WO-2014072913 A1 * | 5/2014 | .............. | C08K 3/26 |
| WO | WO2014072913 A1 | 5/2014 | | |
| WO | WO-2014133067 A1 * | 9/2014 | .............. | H01M 4/62 |
| WO | WO2014133067 A1 | 9/2014 | | |
| WO | WO2015033827 A1 | 3/2015 | | |
| WO | WO2015144648 A1 | 10/2015 | | |

* cited by examiner

CELLULOSE BASED FUNCTIONAL COMPOSITES, ENERGY STORAGE DEVICES AND MANUFACTURING METHODS THEREOF

TECHNICAL FIELD

The present invention relates to manufacture of functional composites containing cellulose based materials as well as such composites and composite structures.

Cellulose based functional composites include electrically functionalised structures such as energy storage devices.

BACKGROUND ART

WO 2010/134868 A1 discloses a method of producing a cellulose based paper with enhanced mechanical properties. The method involves providing a suspension of well dispersed modified cellulose at a low concentration. The properties and the chemical structure of the paper make it suitable for in vivo applications such as implant material.

WO 2012/049198 A1 discloses a process for the production of a surface coated support material wherein said process comprises contacting a support material with an aqueous dispersion of nanocellulose. The surface coated support material can be used in a composite material.

WO 2014/087053 A1 discloses nanocellulose composites comprising nanocellulose material mixed with a polymer.

DISCLOSURE OF INVENTION

It is an object of the present invention to create new technologies for utilizing cellulose based materials in composites and electrically functionalised structures, such as energy storage devices.

The object of the invention is achieved by means of high consistency fibrillated cellulose with at least one functional additive. This high consistency mixture is processed to form the composite structure having a shape and then dried or let to dry.

The invention provides a new technology for utilizing cellulose based materials in composites and electrically functionalised structures, such as energy storage devices.

According to embodiments, the invention allows new methods that are energy-efficient. Other advantages provided by certain embodiments include easier manufacturing and allowing new shapes and dimensions for the structures.

Thus, such mixtures and processes can also be used to make new structures with novel features.

BRIEF DESCRIPTION OF DRAWINGS

For a more complete understanding of the present invention and the advantages thereof, the invention is now described with the aid of the examples and with reference to the following drawings, in which.

MODES FOR CARRYING OUT THE INVENTION

While the embodiments are applicable in several areas of technology and can be used to manufacture various different articles and components, we will exemplify the embodiments by means of some specific examples.

Figure 1:
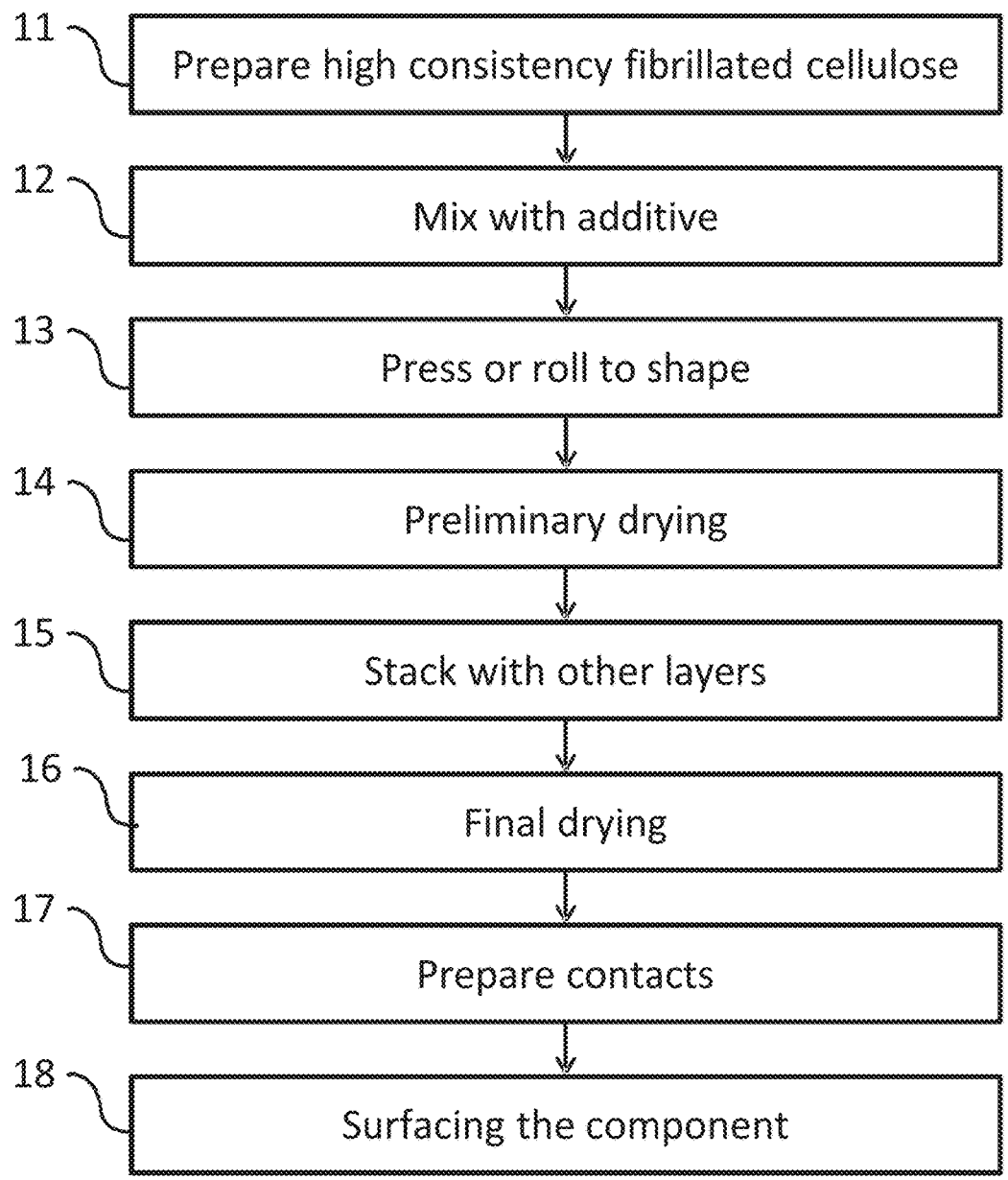
FIG. 1 presents a method according to an embodiment of the invention.

FIG. 1 describes a method for manufacturing a supercapacitor according to an embodiment. According to FIG. 1, step 11 comprises preparing high consistency fibrillated cellulose. The term "high consistency" means over 20% of dry solids consistency. The fibrillated cellulose comprises microfibrillated cellulose and/or nanofibrillated cellulose. The fibrillated cellulose can be prepared, for example, using methods described in more detail later in this specification. In step 12, the high consistency fibrillated cellulose is mixed with at least one additive. In this example, the additive comprises graphite and graphene particles. The mixture contains water up to 80% of weight and dry solids at least 20% of weight. The dry solids contain:

Fibrillated cellulose 10-70% of weight of dry solids
Carbon based particles 30-90% of weight of dry solids
Other additives 0-50% of weight of dry solids At least 20%, such as 30-90% of weight of the carbon based particles are graphite and/or graphene particles.

Thus, preferably, high-consistency cellulose is prepared in the first step of the method 11, whereafter a second, separate step 12 is carried out, where additive is added and mixed with the cellulose.

Possible other additives include additives that can provide or assist electrical properties and/or binding between carbon and fibre material.

The mixture is in gel form and can be easily shaped. Importantly, this relates also to the mixture in gel-form that has the above-described high consistency.

In step 13, the mixture is pressed or rolled to form a sheet.

Step 14 is optional. In step 14, the sheet is partially dried in order to reduce water content. This is done for example when the sheet is to be stacked with a layer of another material, which does not withstand moisture.

In step 15, the sheet is stacked with other layers, for example with an electrolyte layer and a second electrode layer. In this case, the sheet forms the basic structure of the first electrode. The structure can also include at least one separator layer made of at least one additive and fibrillated fibre material.

In step 16, a final drying of the product is conducted, if necessary. Thus, also this step is optional.

In step 17, electrical contacts to the electrodes are made. This can be done, for example, by printing or by adding conductive foil, e.g metallic foil. Conducting adhesive, for instance, can be used to improve the electrical contact between the conductive foil and the electrode.

In step 18, the supercapacitor is finished with surfacing layer. This can be done, for example, by encapsulation in plastic foil or metallic foil.

Figure 2:
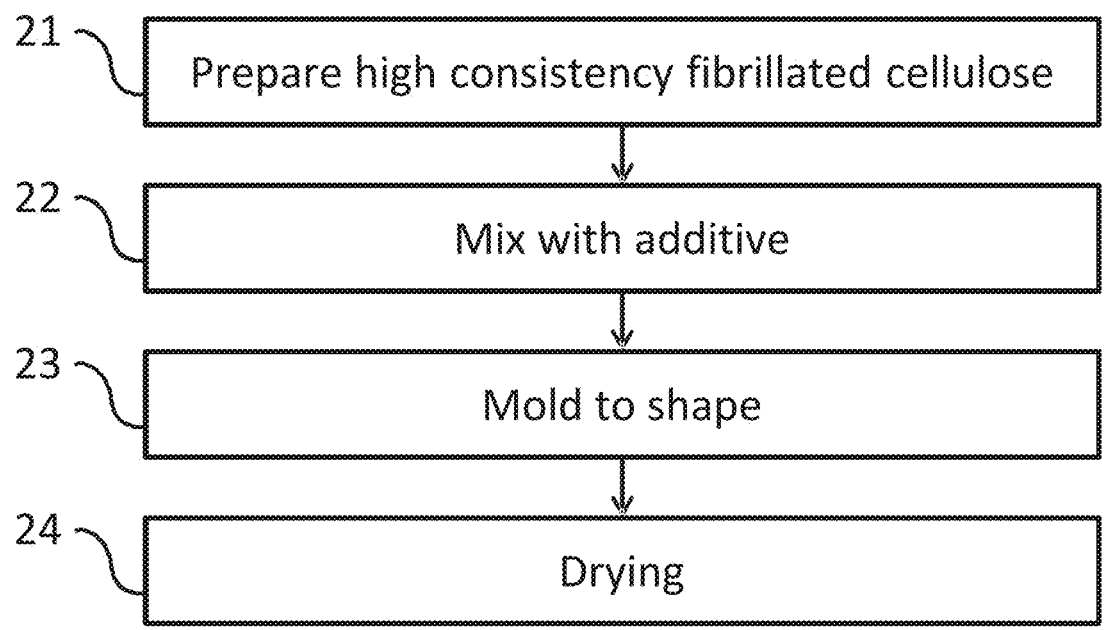
FIG. 2 presents a method according to another embodiment of the invention.

FIG. 2 describes a method for manufacturing a rigid three-dimensional electrode structure. This can be later surfaced with other layers for example by spraying or painting. The three-dimensional structure can form part of a vehicle, for instance. It can be used as a roof structure in a car or in a house or form a support structure for a solar panel, for instance.

According to FIG. 2, step 21 comprises preparing high consistency fibrillated cellulose, as described above with reference to FIG. 1.

In step 22, the high consistency fibrillated cellulose is mixed with at least one additive.

In this example, the additive comprises graphite and graphene particles. The mixture contains water up to 80% of weight and dry solids at least 20% of weight. The dry solids contain:

Fibrillated cellulose 10-70% of weight of dry solids
Carbon based particles 30-90% of weight of dry solids
Other additives 1-50% of weight of dry solids.

Thus, preferably, high-consistency cellulose is prepared in the first step of the method 11, whereafter a second, separate step 22 is carried out, where additive is added and mixed with the cellulose.

At least one of the other additive is a polymer having ability to bind to cellulose fibres and carbon based particles.

Also in this example, at least 20%, such as 30-90% of weight of the carbon based particles are graphite and/or graphene particles.

Possible other additives include additives that can provide or assist electrical properties and/or binding between carbon and fibre material.

The mixture is in gel form and can be easily shaped. Importantly, this relates also to the mixture in gel-form that has the above-described high consistency.

In step 23, the mixture is molded to final shape.

In step 24, the mold is dried to the structure its desired rigidity.

Alternatively to the above steps 23 and 24, the mixture can be given an preliminary shape and then dried. After the object to be made has a sufficient hardness, it can be machined to give the final shape. Additionally, a surfacing, such as a film of carbon and fibre material, can be attached or applied on the surface of the made object.

According to an embodiment of the invention, the present method for making a composite structure comprises
- obtaining a mixture containing solids and water, the solids content of the mixture being at least 20% of the weight of the mixture, the solids containing at least cellulose and at least one functional additive, wherein at least a portion of the cellulose is fibrillated cellulose;
- processing the mixture having the solids content of at least 20% of the weight to form the composite structure having a shape; and
- reducing the water content of the mixture to solidify the formed composite structure.

Preferably, the method is characterized in that
the obtained mixture is in gel form and the step of obtaining the mixture comprises:
- a step of preparing (11; 21) a mixture comprising fibrillated cellulose and water such that the solids content of the mixture is at least 20% of the weight of the mixture; and
- a step of mixing (12; 22) the mixture obtained from the preparation step (11; 21) with at least one additive and thereby obtaining the mixture in gel form, the solids content of the gel being at least 20% of the weight of the gel; and
- using said gel as the mixture is in step of processing to form the composite structure having the shape.

Embodiments offer a new solution for cellulose based energy storage devices such as supercapacitors (later referred as SC) for flexible and wearable devices. Using nanocellulose as both SC separator material and as a binder for electrode material makes it possible to manufacture SC's in a simple and cost efficient way. Further, it gives technical benefits such as low internal losses because it makes it possible to create optimal contact between electrodes and separator layer. Fibrillated cellulose containing material is also lightweight material which means that weight of the manufactured SC's is low. This is beneficial for mobile applications as well as for use in vehicles.

Embodiments offer new solution for cellulose based energy storage devices for flexible and wearable devices.

Previous implementations have been manufactured by laminating or filtrating separate layers on each other. Embodiments provide more efficient method to manufacture supercapacitors and battery structures having optimal contact between electrodes and separator layer. Also manufacturing from fibrillated cellulose containing material, such as enzyme treated cellulose, is simple and cost efficient due to high solids contents of over 25%.

Some prior methods conductive layer has been filtered on nanocellulose sheet. Procedure is time consuming and requires excessive amount of drying energy. The layers in SC structures are being combined by laminating.

Supercapacitors are attractive energy storage devices for flexible and wearable devices. Rapid development of such devices has promoted needs for flexible and light weight energy sources. SCs possess high power characteristics, long cycle lifetime, no maintenance or replacement. To successfully manufacture a high-performance flexible supercapacitor, it is good to consider such aspects as physical flexibility, electrochemical properties and mechanical integration of different materials. Fibers are good SC substrates since they are flexible and can be integrated with conductive materials such as CNT's and activated carbon.

When stronger fiber structures are desired nanocellulose can be used to make structures with superior mechanical properties. Nanocellulose as low consistency suspension may hinder production technologies and commercialization efforts while tightly binded water is difficult to remove as films are formed from the suspension by evaporation of water. Nanocellulose like material can be manufactured using enzymes to break down the fibre structure. Such procedure enables higher solids contents to be used meaning less water is present to be evaporated. Solids up to 35% can be used compared to nanocellulose suspension solids of 2%. The enzyme based fibrillated cellulose can be formed directly to desired shapes using molded pulp-type techniques. Film making from enzyme treated nanocellulose is possible to implement using e.g consecutive rollers to thin the film to desired thickness level followed by moderate drying. The manufacturing process is much more simpler to implement by using enzyme treatment to make nanocellulose like material.

If solid electrolytes are used manufactured power source structures can also be rigid. In this case they can also be used as structural elements in for example cars where they could be e.g. integrated inside the roof of the car.

One process for manufacturing fibrillated cellulose is described in Finnish patent application No. 20136282, which was filed on 18 Dec. 2013 and not made public at the time of filing the first application for the present invention. The whole content of the Finnish patent application No. 20136282 is incorporated herein by reference. The method is also discussed below.

The method is based on the ability of certain cellulases to loosen and fibrillate cellulose structure and use of a tailored enzyme mix, which facilitates fibrillating activity instead of cellulose hydrolysis. The desired fibrillated cellulose is produced by using the enzyme mix, which comprises mainly cellobiohydrolase(s), some endoglucanase(s), and may also contain other enzyme activities, such as β-glucosidase or hemicellulases.

These enzymes are preferably used in a ratio, which minimizes the cellulose degradation, but accelerates production of fibrillated cellulose. This type of action is favored by choosing enzymes with varying thermostability and controlling their activity by process temperature. The loosening of the cellulose fibres is achieved preferably by simultaneous enzymatic and mechanical treatment.

This method has an advantage that the product after treatment has lower moisture content (60-80%) compared to existing methods, which produce nanocellulose at 97-99% moisture content. Thus, the material can be used in embodiments, which cannot tolerate large amounts of water associated with the fibrillated cellulose.

According to an embodiment, the method comprises producing fibrillated cellulose in an improved and energy efficient way, which process comprises a fibrillation of the starting cellulose material with enzyme(s) and enhancing the fibrillation mechanically.

The term "fibrillated cellulose" is here intended to encompass all fibrillated cellulose materials, having typically minimum lateral dimensions of 5-20 nanometers and longitudinal dimensions from 10 nanometers to several microns, even up to 100 μm.

As a starting material pulp, unbleached pulp or native biomass of different origin (e.g. wood, annual plants, crop residues) can be used. Pulp material can be for example bleached pine pulp. Particularly, "slurry" is used, which is here intended to mean a starting material, e.g. wood pulp, which comprises the cellulose fibres that are processed in an aqueous dispersion. The starting consistency of the slurry is preferably higher than 10%, such as higher than 15% by weight. Slurry consistency may be even over 30%. The starting material i.e. pulp or biomass can also be in a grinded form.

In prior art technology fibrillation is generally carried out by grinding or high-pressure homogenizing, possibly with the help of chemical pre-treatments such as strong acid hydrolysis or chemical oxidation. In the present method, it is possible to use an enzymatic fibrillation in conjunction with low energy mixing, i.e. a procedure including at least one enzymatic treatment of the fibres. Suitable machinery includes any equipment enabling adequate mixing in high consistency without having an excessive high shear or cutting action upon fibres. These include e.g. mixers, compounders, extruders or kneaders. This enzymatic fibrillation can be enhanced by using a mechanical treatment to further disintegrate the fibres, which mechanical treatment for example can be carried out by using a homogenizer, grinder or fluidizer.

Said combination of mechanical treatment and enzymatic treatment results in a more efficient production process for fibrillated cellulose compared to the simultaneous procedure used in the prior art. The increased efficiency is due to the synergistic effect of this combined treatment. The mechanical treatment carried out in high consistency conditions in conjunction with the enzymatic treatment will open and unravel fibre cell wall allowing the enzymes to have easier access to the fibre matrix. Enzymes will then attack to uncovered fibre surfaces and further disintegrate fibre structure. Because of the combined treatment, the enzymes are distributed more thoroughly and homogeneously throughout the slurry and they will find more suitable places to attach to, thus making the fibrillation more efficient. High consistency promotes gentle fibre-fibre friction which enhances the fibrillating effect of the treatment. Since the enzymatic treatment loosens up the fibres, mechanical treatment can be performed in a softer manner and in milder reaction conditions.

An advantage of this method is that fibrillated cellulose is produced enzymatically, i.e. gently, by using a low energy demanding mechanical mixer. Another advantage is that it is possible to enhance the fibrillation in a desired and controlled way, without too high degradation, thus producing fibrillated material of a controlled quality. Enzymes are used so that the cellulose degradation compared to the produced fibrillated material is as low as possible. Sugars that are produced into the end-product may also be furthermore exploited. Researchers have shown that these sugars can be fermented to for example ethanol by common yeast.

In the method, the fibrillation is carried out by using an enzyme mix having mainly a cellobiohydrolase (CBH) activity and a low endoglucanase (EG) activity, wherein the endoglucanase activity is very low, but sufficient enough to create new chain ends for CBH action. In addition, it is preferred to use an enzyme mix and reaction conditions, wherein the cellobiohydrolase activity is more thermostable than the endoglucanase activity. The enzyme mix may optionally contain assisting carbohydrate active enzymes such as β-glucosidases, hemicellulases, pectinases or lytic polysaccharide mono-oxygenases, or their combinations.

Cellobiohydrolases (CBHs) have been shown to act processively and unidirectionally along cellulose fibre starting either from reducing or non-reducing chain end and liberating cellobiose as the main product. Characteristic for CBHs are that DP (degree of polymerization) of cellulose is affected only slightly. Endoglucanases attack randomly along cellulose chain creating new sites for CBHs to act. The extent of new chain ends created by endoglucanases can be controlled by enzyme dosage, treatment time and temperature profile or their combinations. The role of β-glucosidase is to hydrolyze arising cello-oligomers to glucose and to prevent end-product inhibition of CBHs.

The reaction temperature of the process is chosen according to the enzymes that are used. In an embodiment, the fibrillation is carried out in two stages: selecting such reaction temperature, which allows both cellobiohydrolase and endoglucanase to be active in a first stage and inactivating the endoglucanase activity by increasing the reaction temperature in a second stage. Then, the temperatures used can be between 0-50° C. in the first stage and between 50-80° C. in the second stage, for instance. After treatment, when necessary, inactivation of enzyme activity can be performed by heating up the material to 100° C. for 15-30 min e.g. by steam. Alternatively, inactivation can also be carried out by pH adjustment outside pH optima of the enzymes.

In one embodiment the temperature is kept low (below or about 50° C.) in the beginning of the reaction and then raised up to about 70° C. for the remaining reaction time. Enzyme products usually always contain minor traces of side activities. Herein low temperature first allows the enzymes to co-operate, after which high temperature inactivates the remaining side activities allowing cellobiohydrolase work alone on the fibre.

Based on the above described temperature and/or pH controlling, in one embodiment the reaction is carried out by having only endoglucanase activity in a first stage and only cellobiohydrolase activity in a second stage (i.e. CBH addition and EG inactivation in a second stage) or by using an enzyme mix comprising said enzymes with high initial endoglucanase activity, which is correspondingly inactivated e.g. by increasing the temperature in a second stage.

CBH I and CBH II tend to hydrolyze cellulose from chain ends, whereas endoglucanase attacks randomly cellulose chain with concomitant decrease of DP. It is thereby good to use an enzyme mix, which has at least small traces of endoglucanase activity, because cellobiohydrolases can utilize chain ends that are provided by endoglucanase. Sufficient amount of endoglucanase is dependent on endoglucanase in question, since specific activity of endoglucanases varies greatly and some of them are very difficult to analyze even with the most sensitive methods (e.g. CMC viscosity method). Therefore proper amount of endoglucanase activity can even exist as a contaminant side activity in the preparation. Higher endoglucanase activities, however, work synergistically with CBH releasing a lot of soluble oligo-saccharides causing yield losses.

The treatment time can vary between 15 minutes and 25 hours, for instance, According to an embodiment, the treatment time is from 1 hour to 6 hours. Enzymes are added before or during the mechanical treatment, for example by spraying. It is noteworthy, that by using enzymes and low energy demanding mechanical mixing together, also longer treatments lead to a more energy efficient process, compared to traditional processing, such as grinding and high-pressure homogenizing.

According to one embodiment, mechanical agitation is carried out without using grinding forces that cause excessive degradation of the fibres and consumption of energy. An example of a suitable mechanical mixer to be used in the process is a non-refining mixer such as a plough share mixer, a screw mixer, kneader, compounder or an extruder. Usually it is good to keep mixing speed rather low, such as around 100 rpm. In addition, according to a further embodiment, the fibrillation may be enhanced by a post-treatment step such as a grinding or a high shear treatment in an extruder, homogenizer or fluidizer.

The above-described methods can be used to manufacture fibrillated cellulose material, which has lower moisture content (60-80%) compared to existing methods, which produce nanocellulose at 97-99% moisture content.

As is apparent from the above discussion, there is provided a method of making a composite structure, the method comprising:
  obtaining a mixture containing solids and water, the solids content of the mixture being at least 20% of the weight of the mixture, the solids containing at least cellulose and at least one functional additive, wherein at least a portion of the cellulose is fibrillated cellulose;
  processing the mixture having the solids content of at least 20% of the weight to form the composite structure having a shape; and
  reducing the water content of the mixture to solidify the formed composite structure.

According to an embodiment, the shape is a film-shape such as the manufactured structure or object is a film.

According to an embodiment, the solids content of the mixture is at least 20% of the weight of the mixture during said processing. According to another embodiment, the solids content of the mixture is at least 25% of the weight of the mixture during said processing.

According to an embodiment, the at least one functional additive comprises at least one electrically conductive additive, such as carbon nanotubes (CNTs), single-walled nanotubes (SWNTs), multi-walled nanotubes (MWNTs), activated carbon (AC), or graphene.

According to an embodiment, the at least one functional additive comprises at least one cathode chemical and/or anode chemical, such as lithium or lithium based chemicals.

According to another embodiment, the at least one functional additive comprises at least one electrolyte. Electrolytes can include, for example, dry polymer electrolytes, gel electrolytes, water-soluble salts, acids, and/or synthetic polymers. According to an embodiment, the at least one functional additive comprises at least one carbon component, the at least one carbon component being one of activated carbon, graphite, graphene and carbon nanotubes.

According to a further embodiment, the content of the at least one carbon component in the solids of the mixture is 50-95%, such as 55-90%, such as 60-85% of weight of the solids.

According to an even further embodiment, the total content of the cellulose and carbon components in the solids of the mixture is at least 75%, such at least 90%, such as at least 95% of weight of the solids.

According to an embodiment, the at least one functional additive comprises at least one of silicon and lithium.

According to an embodiment, the fibrillated cellulose comprises cellulose fibres having diameters less than 10 nanometers.

According to a further embodiment, the the portion of cellulose fibres having diameters less than 10 nanometers is at least 5%, such as at least 10%, such as at least 25% of the weight of the fibrillated cellulose.

According to another embodiment, the fibrillated cellulose comprises cellulose fibres having diameters less than 20 nanometers.

According to a further embodiment, the the portion of cellulose fibres having diameters less than 20 nanometers is at least 5%, such as at least 10%, such as at least 25% of the weight of the fibrillated cellulose.

According to an embodiment, the content of the cellulose in the solids of the mixture is 5-50%, such as 10-45%, such as 15-40% of weight of the solids.

According to an embodiment, the processing comprises moulding the mixture.

According to another embodiment, the the processing comprises using a roller or a press to form the composite structure in the shape of a film.

According to another aspect, there is provided a method of manufacturing an energy storage device, the method comprising providing a first electrode, a second electrode and a separator layer between and in contact with the first electrode and the second electrode. In the method, at least one of the first electrode, the second electrode and the separator layer is made by a method according to one of the above-described embodiment.

According to an embodiment, the method comprises:
  making the first electrode by processing a first mixture containing solids and water, where the solids content of the mixture is at least 20% of the weight of the mixture and the solids contain at least cellulose and at least one electrically conductive additive;
  making the separator layer by processing a second mixture containing solids and water, where the solids content of the mixture is at least 20% of the weight of the mixture and the solids contain at least cellulose and at least one electrolyte; and
  applying compressive force to bind the first electrode and the separator layer together.

According to a further embodiment, the method comprises:
  making the first electrode and the second electrode by processing a first mixture containing solids and water, where the solids content of the mixture is at least 20% of the weight of the mixture and the solids contain at least cellulose and at least one electrically conductive additive;
  making a separator layer by processing a second mixture containing solids and water, where the solids content of the mixture is at least 20% of the weight of the mixture and the solids contain at least cellulose and at least one electrolyte; and applying compressive force to bind together the first electrode, the separator layer and the second electrode.

According to an aspect, there is provided a mixture for use in the method according embodiments described above. The mixture contains solids and water, the solids content of the mixture being at least 20% of the weight of the mixture, the solids containing at least cellulose and at least one functional additive, at least a portion of the cellulose being fibrillated cellulose.

According to an embodiment, the at least one functional additive comprises at least one of electrically conductive additive, cathode chemical and anode chemical.

According to an embodiment, the at least one functional additive comprises at least one electrolyte.

According to an embodiment, the at least one functional additive comprises at least one carbon component.

According to an embodiment, the at least one carbon component comprises activated carbon, graphite, graphene and/or carbon nanotubes.

According to an embodiment, the content of the at least one carbon component in the solids of the mixture is 50-95%, such as 55-90%, such as 60-85% of weight of the solids.

According to an embodiment, the at least one functional additive comprises at least one of silicon and lithium. Lithium additive can be in the form of lithium containing chemicals. Also silicon can be in the form of a silicon containing chemical.

According to an embodiment, the fibrillated cellulose comprises nanocellulose.

According to another embodiment, nanocellulose comprises cellulose fibres having diameters less than 20 nanometers.

According to a further embodiment, the the portion of cellulose fibres having diameters less than 20 nanometers is at least 5%, such as at least 10%, such as at least 25% of the weight of the fibrillated cellulose.

According to an aspect, there is provided a composite structure made by one of the embodiments described above and comprising nanocellulose and at least one electrically conductive additive.

According to an embodiment, the composite structure has a three-dimensional shape.

According to an embodiment, the term three-dimensional shape refers to a shape that has portions of substantial curvature, thickness variation, apertures, protrusions or similar non-planar portions.

A three-dimensional shape can be achieved by moulding and/or machining, for instance.

According to an embodiment, the composite structure can have two or three layers, or more generally a plurality of layers. These layers can be made of the above-discussed mixtures. Additionally, also other mixtures or substances can be used in the composite structure. When making two or more layers of the above-disclosed mixtures, the mixtures used for each of these layers can be mutually same or different. For example, one layer can be made using a first functional additive and another layer using a second functional additive different from the first functional additive. Similarly, a further layer can be made using a third functional additive.

According to an embodiment, the at least one electrically conductive additive comprises at least one carbon component, the at least one carbon component being one of activated carbon, graphite, graphene and carbon nanotubes, wherein the content of the at least one carbon component in the solids of the composite structure is 50-95%, such as 55-90%, such as 60-85% of weight of the solids, and the content of the cellulose in the solids of the composite structure is 5-50%, such as 10-45%, such as 15-40% of weight of the solids.

The above description is only to exemplify the invention and is not intended to limit the scope of protection offered by the claims. The claims are also intended to cover the equivalents thereof and not to be construed literally.

The invention claimed is:

1. A method of making a composite structure, the method comprising:
   obtaining a mixture in gel form, the step of obtaining the mixture in gel form comprising:
      a step of preparing a mixture comprising at least cellulose, at least a portion of which is fibrillated cellulose, and water such that the solids content of the mixture is at least 20% of the weight of the mixture; and
      a step of mixing the mixture obtained from the preparation step with at least one functional additive comprising at least one electrolyte, at least one of electrically conductive additive, cathode chemical, and anode chemical, at least one carbon component, or at least one of silicon and lithium, thereby obtaining the mixture in gel form containing the cellulose and the at least one functional additive as solids, the solids content of the gel being at least 20%, and up to 35%, of the weight of the gel,
   processing the mixture in gel form having the solids content of at least 20%, and up to 35%, of the weight to form the composite structure having a shape; and
   reducing the water content of the mixture to solidify the formed composite structure.

2. The method according to claim 1, wherein the solids content of the mixture is at least 25% of the weight of the mixture, during said processing.

3. The method according to claim 1, wherein the at least one functional additive comprises at least one carbon component, the at least one carbon component being one of activated carbon, graphite, graphene and carbon nanotubes.

4. The method according to claim 3, wherein the content of the at least one carbon component in the solids of the mixture is 50-95% of weight of the solids.

5. The method according to claim 4, wherein the total content of the cellulose and carbon components in the solids of the mixture is at least 75% of weight of the solids.

6. The method according to claim 4, wherein the total content of the cellulose and carbon components in the solids of the mixture is at least 90% of weight of the solids.

7. The method according to claim 3, wherein the content of the at least one carbon component in the solids of the mixture is 55-90% of the weight of the solids.

8. The method according to claim 1, wherein the fibrillated cellulose comprises cellulose fibres having diameters less than 20 nanometers.

9. The method according to claim 8, wherein the portion of cellulose fibres having diameters less than 20 nanometers is at least 5% of the weight of the fibrillated cellulose.

10. The method according to claim 8, wherein the portion of cellulose fibres having diameters less than 20 nanometers is at least 10% of the weight of the fibrillated cellulose.

11. The method according to claim 1, wherein the content of the cellulose in the solids of the mixture is 5-50% of weight of the solids.

12. The method according to claim 1, wherein the processing comprises moulding and/or machining the mixture in the shape.

13. The method according to claim 1, wherein the processing comprises using a roller or a press to form the composite structure in the shape of a film.

14. The method according to claim 1, wherein the content of the cellulose in the solids of the mixture is 10-45% of weight of the solids.

15. A method of manufacturing an energy storage device, the method comprising:
   providing a first electrode, a second electrode and a separator layer between and in contact with the first electrode and the second electrode; and
   making the first electrode, the second electrode and the separator layer by:
   obtaining a mixture containing solids and water, the solids content of the mixture being at least 20% of the weight of the mixture, the solids containing at least cellulose and at least one functional additive, wherein at least a portion of the cellulose is fibrillated cellulose;
   processing the mixture having the solids content of at least 20% of the weight to form the composite structure having a shape; and
   reducing the water content of the mixture to solidify the formed composite structure.

16. The method according to claim 15, further comprising:
   making the first electrode and the second electrode by processing a first mixture containing solids and water, where the solids content of the mixture is at least 20% of the weight of the mixture and the solids contain at least cellulose and at least one electrically conductive additive;
   making a separator layer by processing a second mixture containing solids and water, where the solids content of the mixture is at least 20% of the weight of the mixture and the solids contain at least cellulose and at least one electrolyte; and
   applying compressive force to bind together the first electrode, the separator layer and the second electrode.

17. A mixture for use in a method of making a composite structure, the mixture being in gel form and containing solids and water, the solids content of the mixture being at least 20%, and up to 35%, of the weight of the mixture, the solids containing at least cellulose, at least a portion of which is fibrillated cellulose, and at least one functional additive comprising at least one of electrically conductive additive, cathode chemical and anode chemical, at least one carbon component, or at least one of silicon and lithium, and the method of making the composite structure comprising:
   obtaining a mixture in gel form, the step of obtaining the mixture comprising:
      a step of preparing a mixture comprising at least cellulose, at least a portion of which is fibrillated cellulose, and water such that the solids content of the mixture is at least 20% of the weight of the mixture; and
      a step of mixing the mixture obtained from the preparation step with at least one functional additive comprising at least one of electrically conductive additive, cathode chemical, and anode chemical, at least one carbon component, or at least one of silicon and lithium, thereby obtaining the mixture in gel form containing the cellulose and the at least one functional additive as solids, the solids content of the gel being at least 20%, and up to 35%, of the weight of the gel,
   processing the mixture in gel form having the solids content of at least 20%, and up to 35%, of the weight to form the composite structure having a shape; and
   reducing the water content of the mixture to solidify the formed composite structure.

18. The mixture according to claim 17, wherein the at least one functional additive comprises at least one carbon component, the at least one carbon component being one of activated carbon, graphite, graphene and carbon nanotubes.

19. The mixture according to claim 18, wherein the content of the at least one carbon component in the solids of the mixture is 50-95% of weight of the solids.

20. The mixture according to claim 18, wherein the content of the at least one carbon component in the solids of the mixture is 55-95% of weight of the solids.

21. The mixture according to claim 17, wherein the fibrillated cellulose comprises nanocellulose.

* * * * *